United States Patent
Loil

(10) Patent No.: US 8,467,068 B2
(45) Date of Patent: Jun. 18, 2013

(54) LASER GYRO COMPRISING A CYLINDRICAL SOLID AMPLIFIER BAR, AND ASSOCIATED METHOD FOR EXCITING A CYLINDRICAL SOLID AMPLIFIER BAR OF A LASER GYRO

(75) Inventor: Eric Loil, Chatellerault (FR)

(73) Assignee: Thales, Neuilly sur Seine (FR)

( * ) Notice: Subject to any disclaimer, the term of this patent is extended or adjusted under 35 U.S.C. 154(b) by 166 days.

(21) Appl. No.: 13/129,094

(22) PCT Filed: Oct. 26, 2009

(86) PCT No.: PCT/EP2009/064053
§ 371 (c)(1),
(2), (4) Date: Sep. 23, 2011

(87) PCT Pub. No.: WO2010/054923
PCT Pub. Date: May 20, 2010

(65) Prior Publication Data
US 2012/0099111 A1   Apr. 26, 2012

(30) Foreign Application Priority Data
Nov. 14, 2008   (FR) ..................................... 08 06376

(51) Int. Cl.
*G01C 19/64* (2006.01)
*G01C 19/00* (2006.01)
*G01P 3/00* (2006.01)

(52) U.S. Cl.
USPC ..................... 356/459; 73/504.01; 73/504.02

(58) Field of Classification Search
USPC ................. 356/459, 460, 471, 472, 473, 474, 356/475; 73/504.01, 504.02, 504.03, 504.04
See application file for complete search history.

(56) References Cited

U.S. PATENT DOCUMENTS
7,589,841 B2   9/2009   Schwartz et al.

FOREIGN PATENT DOCUMENTS
EP   1 890 107 A1   2/2008
FR   2 905 005 A1   2/2008

OTHER PUBLICATIONS

K. Nakagawa, et al., "Highly Sensitive Detection of Molecular Absorption Using a High Finesse Optical Cavity", Optics Communications, May 1, 1994, pp. 369-372, vol. 107, No. 5-6, North-Holland Publishing Co., Amsterdam, NL, XP022624426.

*Primary Examiner* — Gregory J Toatley
*Assistant Examiner* — Maurice Smith
(74) *Attorney, Agent, or Firm* — Baker Hostetler LLP

(57) ABSTRACT

A laser gyro includes a cylindrical solid amplifier bar having an axis of revolution. The laser gyro also includes: an annular piezoelectric element for exciting said solid amplifier element at a predetermined frequency f, along said axis of revolution, said annular piezoelectric element being mounted fixed on one of the two end cross sections of the cylindrical solid amplifier bar so that its axis of revolution coincides with said axis of revolution of said cylindrical solid amplifier bar; and an annular dynamic counterweight mounted fixed on the free end cross section of said annular piezoelectric element so that its axis of revolution coincides with said axis of revolution of said cylindrical solid amplifier bar; said cylindrical solid amplifier bar being dimensioned so as to be considered nondeformable at said excitation frequency f.

11 Claims, 1 Drawing Sheet

LASER GYRO COMPRISING A CYLINDRICAL SOLID AMPLIFIER BAR, AND ASSOCIATED METHOD FOR EXCITING A CYLINDRICAL SOLID AMPLIFIER BAR OF A LASER GYRO

CROSS-REFERENCE TO RELATED APPLICATIONS

This application is a National Stage of International patent application PCT/EP2009/064053, filed on Oct. 26, 2009, which claims priority to foreign French patent application No. FR 0806376, filed on Nov. 14, 2008, the disclosures of which are incorporated by reference in their entirety.

FIELD OF THE INVENTION

The invention relates to a laser gyro comprising a cylindrical solid amplifier bar, to a system for measuring from one to three angular velocities, and to an associated method for exciting a solid amplifier element.

BACKGROUND

A gyrometer is a movement sensor which makes it possible to measure the rotation speed of the reference frame of the sensor with respect to a Galilean reference frame, about one or more axes.

Laser gyrometers, also referred to as laser gyros, for the most part use a gaseous amplifier medium which is conventionally a mixture of helium and neon. It is, however, possible to use a laser gyro with a solid-state amplifier medium, in which the gaseous amplifier medium is replaced by a solid element, for example a matrix of YAG (yttrium aluminum garnet) doped with neodymium.

The operating principle of a laser gyro is based on the Sagnac effect of a bidirectional laser ring cavity to which a rotational movement is imparted. The Sagnac effect induces a frequency difference S2 between two so-called counter-propagating optical emission modes propagating in opposite directions inside the cavity. In the solid media conventionally used, including Nd:YAG, the modes propagating in opposite directions share the same amplifier atoms. The term homogeneous gain is then used. When the two counter-propagating modes have equal or very similar frequencies, the interference signal which results therefrom is a possibly mobile standing wave. The atoms of the gain medium participate commensurately more in the stimulated emission process when they are close to an antinode of the standing wave, and commensurately less when they are close to a node. A population inversion network is then created in the gain medium, circumscribed by the standing wave. This network remains so long as the frequencies of the two counter-propagating modes are sufficiently close together. Its contrast is commensurately less when the frequency difference is large compared with the inverse of the lifetime of the excited level.

French patent application FR 2905005 (THALES) describes a laser gyro comprising at least one optical ring cavity and a solid-state amplifier medium, which are arranged so that two so-called counter-propagating optical modes can propagate in opposite directions to one another inside said optical cavity and pass through the amplifier medium. The amplifier medium is coupled to a transducer device which provides the amplifier medium with a periodic translational movement along an axis substantially parallel to the propagation direction of said optical modes.

Such a device makes it possible to modulate the longitudinal position of the active crystal around an average position, so that the atoms of the crystal are in movement with respect to the nodes and antinodes of the interference pattern formed by the two counter-propagating modes, whatever the frequency difference between these two modes. Such a device makes it possible to reduce the contrast of the gain network and therefore its detrimental effects for the gyrometry measurements, while not modifying the length of the cavity. It also makes it possible to attenuate the effects of the backscattering induced by the amplifier medium. Lastly, this device potentially constitutes a device for processing the blind zone which, depending on the case, may substitute for or be complementary to the conventional mechanical activation device.

Such a device must permit a high excitation frequency, which is necessary for use in the field of civil aviation or in a weapons system. This excitation frequency must be greater than the frequency difference which occurs between the two counter-propagating modes for an input angular frequency of the gyrometer corresponding to the intended measurement range.

One technical difficulty consists in obtaining a sufficiently high mechanical excitation frequency, of the order of a few hundreds of kHz, combined with a large oscillation amplitude of the order of a few microns, without affecting the geometrical and dimensional characteristics of the crystal forming the solid amplifier medium. The reason is that the intended excitation frequency is close to the natural vibration frequencies of the crystal or any other solid of similar dimension, of the order of a few millimeters.

SUMMARY OF THE INVENTION

It is an object of the invention to overcome the various problems mentioned above.

Notably, the present invention makes it possible to produce a perfect mechanical resonator satisfying the conditions mentioned above, by:
limiting the size and number of elements of this device in order to avoid setting in resonation the parts which are not useful or even interfere with the intended overall vibration;
designing assemblies making it possible to connect these elements to one another without the risk of attenuating the excitation or of undesirable deformations of the crystal;
using a resonator architecture which ensures the best possible isolation from the external support, for example by using the tuning fork principle in which the vibration of a part of the resonator (crystal) is dynamically balanced by that of another, perfectly symmetrical part (counterweight), thus ensuring a substantially zero resultant vibration at the point of connection selected as fastening point isolated from the external support.

Thus, a first aspect of the invention provides a laser gyro comprising a cylindrical solid amplifier bar having an axis of revolution. The laser gyro also comprises:
an annular piezoelectric element for exciting said solid amplifier element at a predetermined frequency f, along said axis of revolution, said annular piezoelectric element being mounted fixed on one of the two end cross sections of the cylindrical solid amplifier bar so that its axis of revolution coincides with said axis of revolution of said cylindrical solid amplifier bar; and
an annular dynamic counterweight mounted fixed on the free end cross section of said annular piezoelectric element so that its axis of revolution coincides with said axis of revolution of said cylindrical solid amplifier bar; said cylindrical solid amplifier bar being dimensioned so as to be considered nondeformable at said excitation frequency f.

Such a laser gyro makes it possible, according to the principles described above, to excite the solid crystal bar at the frequency and amplitude desired for the intended applications, while ensuring minimal perturbations of geometrical type or dimensional variations of the crystal, which are prejudicial to correct operation of the laser gyro.

According to one embodiment, the internal diameter of said annular piezoelectric element and the internal diameter of said annular dynamic counterweight are greater than a threshold.

The incident laser beam is thus not obstructed or limited, because this threshold is greater than the diameter of the laser beam.

In one embodiment, the internal diameter of said annular piezoelectric element and the internal diameter of said annular dynamic counterweight are equal.

Thus, all the space available around the path of the laser is optimized in order to promote the compactness and the rigidity of the constituent elements of the resonator, as well as their mode of assembly.

According to one embodiment, the solid amplifier element comprises any combination of the following solid amplifier media: crystal Nd:YAG, Nd:KGW, Nd:YVO$_4$, Yb:GdCOB, and Nd, Cr:GSGG.

In one embodiment, said frequency f may be between 100 and 250 kHz.

In one embodiment, said fixed mountings are rigid adhesive bonds with a Young's modulus of the order of one GPa, and with a fine thickness of less than 0.02 mm.

The use of rigid adhesive bonds has the advantage of reducing the stresses and deformations of the crystal bar when it is assembled with the other elements, and of constituting a reliable and effective interface in relation to transmission of the vibration waves with low attenuation of the excitation through the thickness of the joint.

According to one embodiment, said annular piezoelectric element comprises two surface electrodes in the form of central rings arranged on the end cross sections of said annular piezoelectric element.

The surface electrodes, controlled with electrical voltages, make it possible to manage the vibrations of the cylindrical solid amplifier bar.

In one embodiment, the laser gyro comprises suspension means adapted to fix the cylindrical solid amplifier bar to an external system or a support on which it is mounted, and to vibrationally decouple it therefrom, said suspension means comprising an exterior ring of said annular piezoelectric element.

The external annular cross section of the annular piezoelectric element thus has a suspension function making it possible to fix and vibrationally decouple the cylindrical solid amplifier bar in relation to the system carrying the laser gyro, or a support such as an external casing of the laser gyro.

According to one embodiment, said suspension means furthermore comprise a flexible adhesive bond with a Young's modulus of the order of one MPa.

The use of such a flexible adhesive bond enhances the vibrational decoupling of the cylindrical solid amplifier bar in relation to the system carrying the laser gyro, or a support such as an external casing of the laser gyro.

A second aspect of the invention provides a system for measuring from one to three angular velocities or for measuring from one to three relative angular positions about respective axes, comprising from one to three laser gyros as claimed in one of the preceding claims, respectively oriented along said respective axes and mounted on a common mechanical structure.

Such a multiaxial measurement system allows the combination of subassemblies such as mirrors, or operating means such as activation devices, in a compact and uniform assembly which is beneficial in terms of size, weight or performance.

A third aspect of the invention provides a method for exciting a cylindrical solid amplifier bar of a laser gyro, having an axis of revolution, wherein said solid amplifier element is excited at a predetermined frequency f by an annular piezoelectric element mounted fixed on one of the two end cross sections of the cylindrical solid amplifier bar so that its axis of revolution coincides with said axis of revolution of said cylindrical solid amplifier bar, and the induced unbalance is balanced by an annular dynamic counterweight mounted fixed on the free end cross section of said annular piezoelectric element so that its axis of revolution coincides with said axis of revolution of said cylindrical solid amplifier bar.

BRIEF DESCRIPTION OF THE DRAWINGS

The invention will be understood more clearly on studying some embodiments described by way of entirely nonlimiting examples and illustrated by the appended drawings, in which.

DETAILED DESCRIPTION

In the various figures, elements having the same references are identical.

Figure 1:
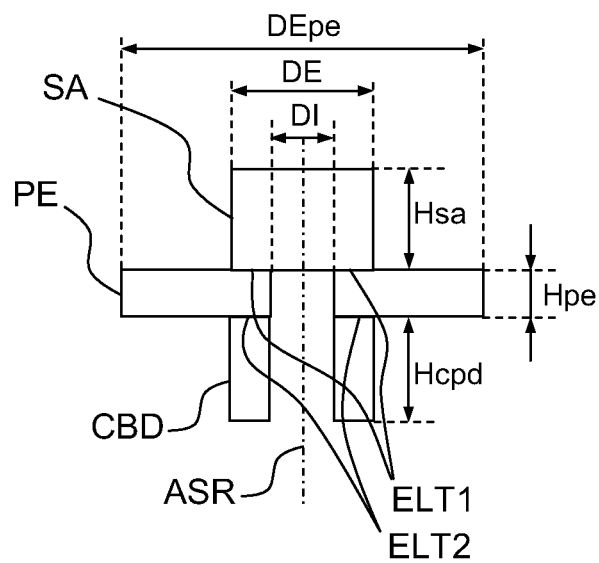
FIG. 1 is a diagram in sectional view of an embodiment of a laser gyro according to one aspect of the invention.
Figure 2:
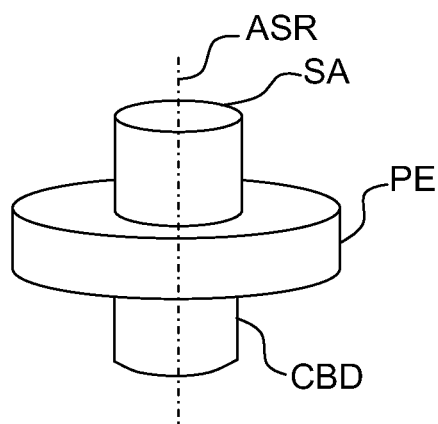
FIG. 2 is a diagram in external view of a laser gyro according to FIG. 1, according to one aspect of the invention.

As illustrated in FIG. 1, a laser gyro with a symmetry of revolution axis ASR is represented in section.

The laser gyro comprises a cylindrical solid amplifier bar, such as an Nd:YAG crystal, referenced SA. As an alternative, the solid-state amplifier element may be any combination of the solid amplifier media Nd:KGW, Nd:YVO$_4$, Yb:GdCOB and Nd,Cr:GSGG.

An annular piezoelectric element PE, controlled by two annular electrodes ELT1 and ELT2, makes it possible to set in vibration the solid amplifier element in the form of a cylindrical bar SA, at a determined frequency f, along the axis ASR. The geometry of the cylindrical solid amplifier bar SA, and in particular its dimensioning, is arranged so that at the vibration frequency f it can be considered as a nondeformable solid. The annular piezoelectric element PE is mounted fixed, by rigid adhesive bonding, on an end cross section of the cylindrical solid amplifier bar SA. Such a rigid adhesive bond typically has a thickness of less than about 0.02 mm, and a Young's modulus of the order of one GPa.

As a variant, this setting in vibration, at a frequency which can range up to 250 kHz, may be carried out by thermal, mechanical or magnetic excitation, or any combination of these excitations.

The laser gyro comprises a dynamic counterweight, or counterweight CBD mounted fixed by rigid adhesive bonding with a thickness of less than about 0.02 mm, and a Young's modulus of the order of one GPa, on the free end cross section of the annular piezoelectric element PE so that its axis of revolution coincides with the axis of revolution ASR of the cylindrical solid amplifier bar SA.

There is thus a resilient active region formed by the central part of the annular piezoelectric element PE, and a resilient inactive region formed by the peripheral part of the annular piezoelectric element PE.

The central part is electrically excited in axial mode in order to obtain the desired oscillation of the cylindrical solid amplifier bar SA, but in fact generating a radial mode because the annular piezoelectric element PE also deforms in the radial direction. The inactive external part of the annular piezoelectric element PE, however, makes it possible to filter a large part of the vibrations which are transmitted to an external system or a support on which it is mounted.

There is thus vibrational decoupling, which can be improved for example by mounting by flexible adhesive bonding with a Young's modulus of the order of one MPa.

The counterweight CBD makes it possible to balance the axial vibration of the cylindrical solid amplifier bar SA. This dynamic counterweight is in itself set in axial vibration in the opposite direction to the vibration of the cylindrical solid amplifier bar SA. There is thus a substantially zero resultant axial vibration at the intermediate piezoelectric element PE used as a point of fastening for the assembly, which constitutes excellent dynamic decoupling in relation to the external support.

By way of example, vibration at a frequency f of more than 250 kHz can be obtained with a height Hsa of the cylindrical solid amplifier bar of about 3 mm and a diameter of about 3 mm. The external diameter DEpe of the annular piezoelectric element PE is then about 10 mm, and the internal diameter, common to the annular piezoelectric element PE and the dynamic counterweight CBD, is about 3 mm.

The present invention makes it possible to obtain a laser gyro comprising a solid amplifier element in a translational vibration movement, at a frequency which can range up to 250 kHz.

The invention claimed is:

1. A laser gyro comprising a cylindrical solid amplifier bar having an axis of revolution, comprising:
   an annular piezoelectric element for exciting said solid amplifier element at a predetermined frequency, along said axis of revolution, said annular piezoelectric element being mounted fixed on one of the two end cross sections of the cylindrical solid amplifier bar so that its axis of revolution coincides with said axis of revolution of said cylindrical solid amplifier bar; and
   an annular dynamic counterweight mounted fixed on the free end cross section of said annular piezoelectric element so that its axis of revolution coincides with said axis of revolution of said cylindrical solid amplifier bar;
   said cylindrical solid amplifier bar being dimensioned so as to be considered nondeformable at said excitation frequency f.

2. The laser gyro as claimed in claim 1, wherein the internal diameter of said annular piezoelectric element and the internal diameter of said annular dynamic counterweight are greater than a threshold.

3. The laser gyro as claimed in claim 2, wherein the internal diameter of said annular piezoelectric element and the internal diameter of said annular dynamic counterweight are equal.

4. The laser gyro as claimed in claim 1, wherein the solid amplifier element comprises any combination of the following solid amplifier media: crystal Nd:YAG, Nd:KGW, Nd:YVO$_4$, Yb:GdCOB, and Nd,Cr:GSGG.

5. The laser gyro as claimed in claim 1, wherein said predetermined frequency may be between 100 and 250 kHz.

6. The laser gyro as claimed in claim 1, wherein said fixed mountings are rigid adhesive bonds with a Young's modulus of the order of one GPa, and with a fine thickness of less than 0.02 mm.

7. The laser gyro as claimed in claim 1, wherein said annular piezoelectric element comprises two surface electrodes in the form of central rings arranged on the end cross sections of said annular piezoelectric element.

8. The laser gyro as claimed in claim 1, comprising suspension means adapted to fix the cylindrical solid amplifier bar to an external system or a support on which it is mounted, and to vibrationally decouple it therefrom, said suspension means comprising an exterior ring of said annular piezoelectric element.

9. The laser gyro as claimed in claim 8, wherein said suspension means comprise a flexible adhesive bond with a Young's modulus of the order of one MPa.

10. A system for measuring from one to three angular velocities or for measuring from one to three relative angular positions about respective axes, comprising from one to three laser gyros as claimed in claim 1, respectively oriented along said respective axes and mounted on a common mechanical structure.

11. A method for exciting a cylindrical solid amplifier bar of a laser gyro, having an axis of revolution, wherein said solid amplifier element is excited at a predetermined frequency f by an annular piezoelectric element mounted fixed on one of the two end cross sections of the cylindrical solid amplifier bar so that its axis of revolution coincides with said axis of revolution of said cylindrical solid amplifier bar, and the induced unbalance is balanced by an annular dynamic counterweight mounted fixed on the free end cross section of said annular piezoelectric element so that its axis of revolution coincides with said axis of revolution of said cylindrical solid amplifier bar.

* * * * *

UNITED STATES PATENT AND TRADEMARK OFFICE
CERTIFICATE OF CORRECTION

PATENT NO.       : 8,467,068 B2                                   Page 1 of 1
APPLICATION NO. : 13/129094
DATED            : June 18, 2013
INVENTOR(S)      : Eric Loil It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 296 days.

Signed and Sealed this

Eighth Day of September, 2015

Michelle K. Lee
*Director of the United States Patent and Trademark Office*